Figure 1A:
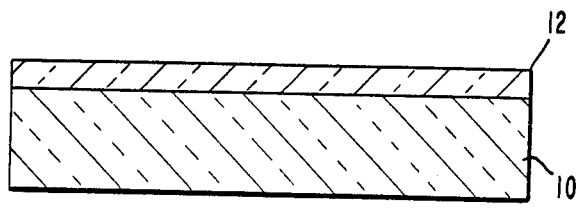
Figure 1B:
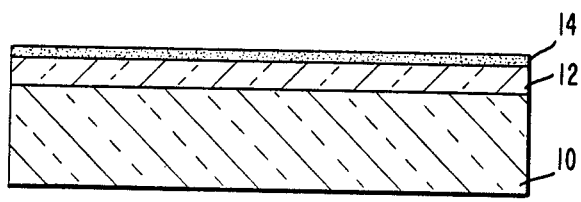
Figure 1C:
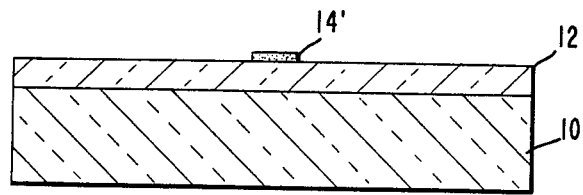
Figure 1D:
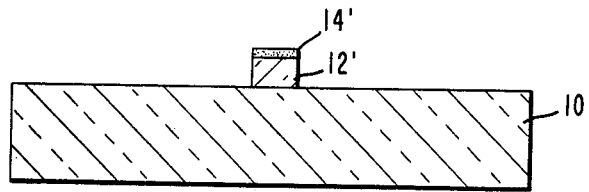
Figure 1E:
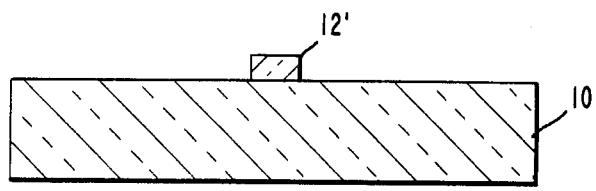
Figure 1F:
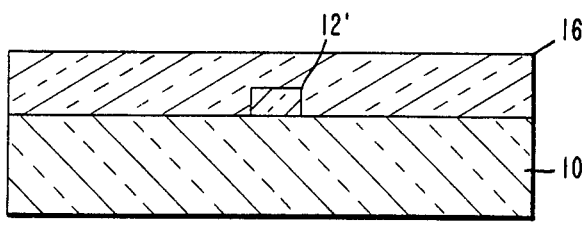

United States Patent [19]

Tangonan

[11] 4,375,312
[45] Mar. 1, 1983

[54] GRADED INDEX WAVEGUIDE STRUCTURE AND PROCESS FOR FORMING SAME

[75] Inventor: Gregory L. Tangonan, Oxnard, Calif.

[73] Assignee: Hughes Aircraft Company, Culver City, Calif.

[21] Appl. No.: 175,998

[22] Filed: Aug. 7, 1980

[51] Int. Cl.³ ............................................. G02B 5/174
[52] U.S. Cl. ..................................... 350/96.12; 65/3.14; 427/163; 430/321; 430/329
[58] Field of Search ............... 350/96.11, 96.12, 96.30, 350/96.31; 65/3.11, 3.14; 427/163; 430/321, 323, 329

[56] References Cited

U.S. PATENT DOCUMENTS

| 3,873,339 | 3/1975 | Hudson | 427/53.1 |
| 3,880,630 | 4/1975 | Izawa | 65/30 |
| 3,934,061 | 1/1976 | Keck et al. | 427/165 |
| 4,090,776 | 5/1978 | Bernal et al. | 350/96.12 |
| 4,152,044 | 5/1979 | Liu | 350/96.12 |
| 4,163,654 | 8/1979 | Krohn et al. | 65/3.11 |
| 4,166,669 | 9/1979 | Leonberger et al. | 350/96.14 |
| 4,275,951 | 6/1981 | Beales et al. | 350/96.31 |
| 4,288,510 | 9/1981 | Tinet et al. | 430/321 X |
| 4,329,016 | 5/1982 | Chen | 350/96.12 |

FOREIGN PATENT DOCUMENTS

55-65910  5/1980  Japan ................................ 350/96.12

OTHER PUBLICATIONS

Butusov et al., "Optical Waveguides on SiO₂ Substrates . . .", *Applied Physics*, vol. 21, No. 2, Feb. 1980, pp. 159-162.

Neuman et al., "Ion-Exchanged Optical Waveguides", *Proc. of E-O Laser Intl. Conf.*, Brighton, U.K., Mar. 1980, pp. 19-30.

*Primary Examiner*—John D. Lee
*Attorney, Agent, or Firm*—Mary E. Lachman; William H. MacAllister; Anthony W. Karambelas

[57] ABSTRACT

The specification discloses a process for forming a graded index waveguide structure by first providing a substrate of a first selected optical material having a chosen index of refraction. Next, a patterned layer of a second optical material is formed on one surface of the substrate or, optionally, within selected cavities formed in the substrate. This second optical material has a refractive index which is larger than the refractive index of the substrate. The patterned layer of the second optical material is formed in a predetermined geometry and to a predetermined thickness. Then, a layer of a third selected optical material is formed on the patterned layer of the second optical material and on the substrate surface to a predetermined thickness. This third optical material has a refractive index which is substantially the same as the refractive index of the substrate. Finally, the substrate with the patterned layer of the second optical material and the layer of the third optical material deposited thereon is heated to an elevated temperature for a period of time sufficient to diffuse the second optical material into the first and third optical materials and to form a graded index waveguide structure.

11 Claims, 13 Drawing Figures

GRADED INDEX WAVEGUIDE STRUCTURE AND PROCESS FOR FORMING SAME

BACKGROUND OF THE INVENTION

1. Field of the invention

This invention relates generally to a process for forming planar coupler devices for optical fibers and the devices formed thereby, and, more particularly, to a process for forming a graded index optical waveguide structure and the device formed by such a process.

2. Description of the Prior Art

Optical communication systems, in which messages are transmitted by carrier waves of optical frequencies that are generated by sources such as lasers or light-emitting diodes, are of much current interest because of the advantages they offer over certain other conventional communication systems, such as a greatly increased number of channels of communication and the ability to use other materials besides expensive copper cables for transmitting messages. An optical waveguide device is used to conduct or guide waves of optical frequencies from one point to another. The operation of an optical waveguide is based on the fact that when a medium which is transparent to light is surrounded or otherwise bounded by another medium having a lower refractive index, light introduced along the inner medium's axis is highly reflected at the boundary with the surrounding medium, thus producing a light guiding effect.

As the development of optical circuits proceeded, it became necessary to have structures which could couple, divide, switch, and modulate the optical waves from one waveguide device to another. A Y-coupler is an example of such a device which is formed in a "Y" shape and couples signals together or divides them apart.

More recent developments in optical circuits have produced a graded index optical fiber, i.e., an optical fiber with a refractive index that is progressively lower from the center of the fiber to the periphery. These graded index optical fibers are highly desirable because they have an increased information bandwidth and information handling capability as compared to conventional stepped-index optical fibers. In using such graded index optical fibers, there is also the need to have structures which can couple, divide, switch, and modulate the optical waves from one such waveguide device to another.

One process for forming such graded index optical couplers makes use of an ion exchange process as described, for example, in a publication by G. H. Chartier et al, in *Electronic Letters*, Vol. 13, pp. 763-764, (1977). By the process of Chartier et al, an eutectic mixture comprising 80 percent lithium sulfate ($Li_2SO_4$) and 20 percent potassium sulfate ($K_2SO_4$) is heated in an oxygen atmosphere to 580° C. A sodium glass slide is suspended over the melt for 30 minutes to allow thermal equilibration with the melt. The slide is then dipped into the melt for 20 minutes, and again suspended over the melt for 10 minutes to avoid thermal shock. Planar waveguides having a depth of 100 micrometers may be made by this process. The coupler structures are formed by appropriately masking the glass slide, for example, with a thick (1-2 micrometers) film of aluminum, prior to dipping the slide into the melt. By such an ion exchange process, lithium ions from the eutectic mixture are exchanged for the sodium ions in the soda glass substrate, thus modifying the refractive index of the ion-exchanged region of the substrate.

There are, however, certain disadvantages to the above-described ion exchange process and the optical waveguide devices formed thereby. One major disadvantage is that the coupling efficiency between a waveguide device formed by an ion exchange process and a graded index fiber is somewhat low, i.e., typically being only about 65%. In addition, there are certain difficulties encountered in carrying out the ion exchange process. For example, at the elevated temperature used for the ion exchange process, lithium sulfate decomposes to lithium oxide ($Li_2O$), which is corrosive to silicon dioxide. The lithium oxide reacts with the silicon dioxide to form $Li_2SiO_3$, with a resultant thinning of the glass substrate. In addition, surface cracks often form on the glass substrate during the ion exchange process, and such cracks produce scattering in the waveguide device formed.

It is the alleviation of the problems associated with this prior art ion exchange process and, further, the formation of an improved coupling structure for use with graded index optical fibers which has a high coupling efficiency, to which the present invention is directed.

SUMMARY OF THE INVENTION

The general purpose of this invention is to provide a new and improved process for forming a graded index waveguide structure which possesses most, if not all, of the advantages of the prior art processes for forming such coupling structures, while alleviating their significant disadvantages discussed above.

In order to accomplish the above-described general purpose of this invention, I have discovered and developed a new and improved process for forming a graded index waveguide structure by first providing a substrate of a first selected optical material having a chosen index of refraction. A patterned layer of a second selected optical material is then formed on one surface of the substrate. This second optical material has a refractive index which is larger than the refractive index of the substrate. The patterned layer of the second optical material is formed in a predetermined geometry and to a predetermined thickness. Next, a layer of a third selected optical material is formed on both the patterned layer of the second optical material and the surface of the substrate to a predetermined thickness. This third optical material has a refractive index which is substantially the same as the refractive index of the substrate. Finally, the substrate with the patterned layer of the second optical material and the layer of the third optical material deposited thereon is heated to an elevated temperature for a period of time sufficient to diffuse the second optical material into the first and the third optical materials and to thus form a graded index waveguide structure.

Accordingly, it is an object of the present invention to provide a new and improved process for forming a graded index optical coupler for use with graded index optical fibers which has improved coupling efficiency.

Another object is to provide a process of the type described in which the graded index waveguide structure has a predetermined geometry.

Still another object is to provide a process of the type described which uses known lithographic procedures and is thus highly reproducible.

ness of the layer 12' and the thickness of the overlayer 16.

Figure 1G:
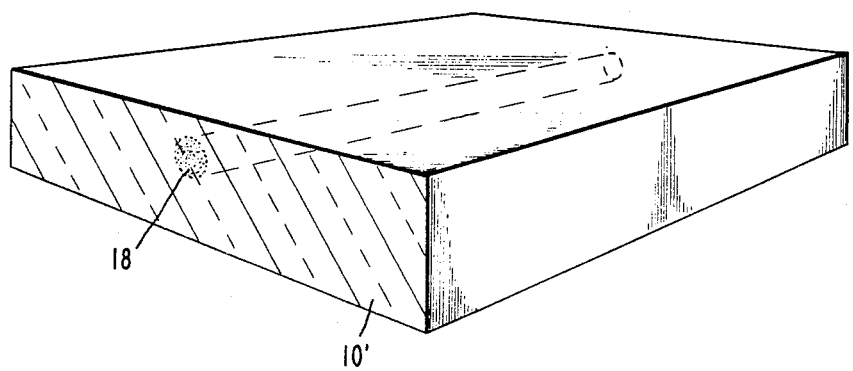

Thus, by the process of the present invention just described, a waveguide coupler is formed in which the waveguiding layer has a graded index to provide improved coupling efficiency between the coupler and a graded index optical fiber. The waveguide coupler formed by the process of the present invention may be formed to have a graded index profile which matches the grading profile of the graded index fiber with which the waveguide structure of the present invention is to be coupled, and thus achieves optimum matching of the fiber core and the coupler core, which results in efficient coupling of light from the fiber into the coupler. The process of the present invention is particularly suited to form a waveguide coupler with a simple parabolic refractive index decrease, which is the grading profile commonly used in graded index fibers. Furthermore, the body of the graded index material is located within the clad of the coupling device structure at a position and with a geometry that matches the core of the optical fiber to be coupled and thus also enhances coupling efficiency. As indicated in FIG. 1g, the body 18 of graded index material has a substantially circular cross-section, which provides effective coupling with an optical fiber (not shown) also having a circular cross-section. In addition, the diameter of the body 18 of graded index material is approximately equal to the core diameter of the fiber to which the coupling device joins, which also provides effective coupling. Further, the process of the present invention offers the advantage that conventional planar processing using known photolithographic techniques may be employed. The standard lithographic procedures and batch process which may be used in practising the present invention provide a high degree of process control and high reproducibility.

Turning now to FIG. 2, there is shown, in schematic cross-section, some of the major steps in a second process embodiment of the present invention for forming a number of graded index optical waveguides simultaneously. FIG. 2a shows a substrate 20 of a first selected optical material, such as fused quartz, which is selectively exposed to an etchant, such as a selected chemical etchant, an ion beam etchant, or a diamond scribe, to form a patterned substrate 20' shown in FIG. 2b, with cavities 21 etched in selected portions of the substrate surface. The pattern in which the substrate 20 is etched is determined by the desired geometry of the waveguide device to be formed. For example, each cavity 21 may be in the form of a channel or a "Y". If a conventional photo-etching procedure is used, a procedure similar to that described in FIG. 1 for etching the layer 12 may be followed.

Figure 2A:
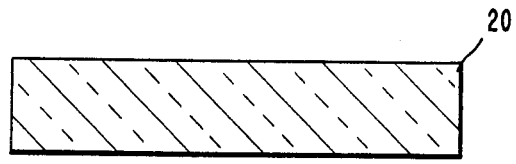
Figure 2B:
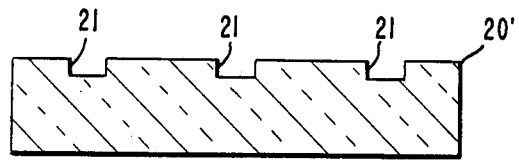
Figure 2C:
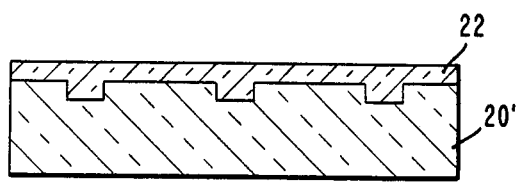
Figure 2D:
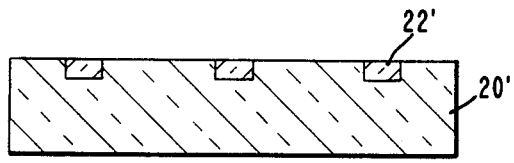

Next, a layer 22 of a second selected optical waveguiding material, such as $GeO_2$, is formed to a predetermined thickness of the surface of the etched substrate 20' and into the cavities 21 etched therein, as shown in FIG. 2c. The layer 22 may be deposited in the manner described in FIG. 1 for the formation of the layer 12. Then, the undesired portions of the layer 22 are removed by a conventional abrasive wafer lapping procedure, for example, to leave behind the desired patterned areas 22' of the second selected optical material in the substrate 20', as shown in FIG. 2d.

Alternatively, the patterned areas 22' of the second selected optical material may be formed by first providing a mask with openings of predetermined geometry on the surface of the substrate 20 and using conventional photo-etching procedures to form the cavities 21 in the substrate 20' shown in FIG. 2b. Next, the layer 22 of the second selected optical material may be deposited over the etchant mask which was left in place and into the cavities 21 in the substrate 20'. Then, the mask may be removed by known lift-off procedures carrying with it unwanted portions of the second optical material and leaving behind the desired patterned areas 22' of the second optical material as shown in FIG. 2d.

Figure 2E:
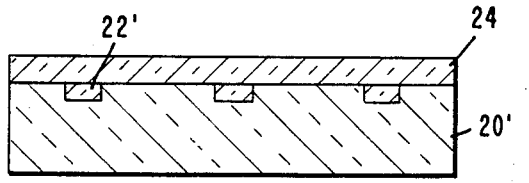

Next, as shown in FIG. 2e, a layer 24 of a third selected optical material that has substantially the same refractive index as the substrate 20 is deposited to a predetermined thickness on the patterned areas 22' of the second selected optical material and on the surface of the substrate 20', as shown in FIG. 2e. The layer 24 may be formed in the manner described in FIG. 1 for the formation of the layer 16.

Figure 2F:
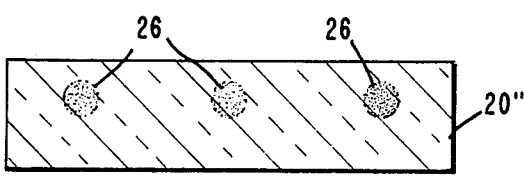

Finally, the structure shown in FIG. 2e is heated in a furnace to a temperature in the range of 1350° C. to 1450° C. for a period of approximately 5 hours, to diffuse the patterned areas 22' of the second optical material into the surrounding substrate 20' and into the surrounding portion of the layer 24 of the third selected optical material, to form the optical waveguide device shown in FIG. 2f.

The waveguide device formed by this second process embodiment of the present invention, as shown in FIG. 2f, comprises a multiplicity of graded index waveguide structures 26 formed simultaneously within a given substrate. As described in relation to FIG. 1, during the above heating for the diffusion process, the layer 24 becomes continuous with the substrate 20' to form the capped substrate 20'' shown in FIG. 2f. The multiple waveguide structures 26 may be formed to be interconnected to each other as desired, by choosing the appropriate pattern for the etching procedure described in relation to FIG. 2b.

The waveguide structure formed by this second process embodiment of the present invention has the same advantages and improved performance characteristics as discussed in relation to the device formed by the first process embodiment of this invention shown in FIG. 1.

EXAMPLE 1

This example illustrates the formation of a graded index optical waveguide structure in accordance with the present invention. Following the procedure described in relation to FIG. 1, a fused quartz substrate having a refractive index of 1.47 and obtained from Corning Glass Works, of Corning, New York, was coated with a layer of germanium oxide having a refractive index of 1.7, to a thickness in the range of 5 to 10 micrometers by a known chemical vapor deposition process previously described herein. The germanium oxide layer was then patterned as described in relation to FIGS. 1b, 1c, and 1d, using Shipley 1350-J resist as the photoresist, exposing the photoresist to radiation having a wavelength in the ultraviolet range, through a mask, and developing the photoresist with Shipley 1350-J developer. The mask was formed to expose a straight channel shape in the photoresist layer. After the germanium oxide layer was patterned in a desired geometry by conventional etching, an overlayer of silicon dioxide having a refractive index of 1.47 and a thickness of 100 micrometers was formed over the germanium oxide layer and the substrate surface by a known chemical vapor deposition process previously discussed formed in a predetermined geometry and to a thickness in the range of 5 to 10 micrometers;

(c) forming a layer of silicon dioxide ($SiO_2$) on said patterned layer of said $GeO_2$ and on said surface of said substrate to a thickness of approximately 100 micrometers, said $SiO_2$ having a refractive index of about 1.47; and (d) heating said substrate with said patterned layer of said $GeO_2$ and said layer of said $SiO_2$ deposited thereon to a temperature of approximately 1400° C. for a period of 5 hours to diffuse said $GeO_2$ into said substrate and into said layer of said $SiO_2$ and to thereby form said graded index waveguide structure.

6. A graded index waveguide structure formed by:
(a) providing a substrate of a first selected optical material having a chosen index of refraction;
(b) forming a patterned layer of a second selected optical material on one surface of said substrate, said second selected optical material having an index of refraction which is larger than said index of refraction of said first selected optical material of said substrate, and said pattern being formed in a predetermined geometry and to a predetermined thickness;
(c) forming a layer of a third selected optical material on said patterned layer of said second optical material and on said surface of said substrate to a predetermined thickness, said third optical material having an index of refraction substantially the same as said index of refraction of said first optical material; and
(d) heating said substrate with said patterned layer of said second optical material and said layer of said third optical material deposited thereon to an elevated temperature for a period of time sufficient to diffuse said second optical material into said first and third optical materials and to thereby form said graded index waveguide structure.

7. The waveguide structure set forth in claim 6 wherein step "b" comprises:
(a) depositing a layer of said second optical material on one surface of said substrate;
(b) depositing a layer of a selected photoresist material on said layer of said second optical material;
(c) exposing said layer of said photoresist to selected radiation through a mask defining said predetermined geometry;
(d) developing said layer of said photoresist after said exposing, to leave behind a patterned portion of said layer of said photoresist which has said predetermined geometry;
(e) removing the portion of said layer of said second optical material exposed by openings in said patterned portion of said layer of said photoresist; and
(f) removing said patterned portion of said layer of said photoresist to leave behind said patterned layer of said second optical material.

8. The waveguide structure set forth in claim 6 wherein:

(a) said substrate is selected from the group consisting of fused quartz and a transparent glass having a softening temperature of 1000° C. or higher;
(b) said second optical material is selected from the group consisting of germanium oxide ($GeO_2$) and lead oxide ($PbO_2$) and is deposited to a thickness in the range of 5 to 10 micrometers; and
(c) said heating is performed at a temperature in the range of 1350° to 1450° C. for a period of approximately 5 hours.

9. A graded index waveguide structure formed by:
(a) providing a substrate of fused quartz having a refractive index of about 1.47;
(b) forming a patterned layer of germanium oxide ($GeO_2$) having a refractive index of about 1.7 on one surface of said substrate, said pattern being formed in a predetermined geometry and to a thickness in the range of 5 to 10 micrometers;
(c) forming a layer of silicon dioxide ($SiO_2$) on said patterned layer of said $GeO_2$ and on said surface of said substrate to a thickness of approximately 100 micrometers, said $SiO_2$ having a refractive index of about 1.47; and
(d) heating said substrate with said patterned layer of said $GeO_2$ and said layer of said $SiO_2$ deposited thereon to a temperature of approximately 1400° C. for a period of approximately 5 hours to diffuse said $GeO_2$ into said substrate and into said layer of said $SiO_2$ and to thereby form said graded index waveguide structure.

10. A process for simultaneously forming a plurality of graded index waveguide structures comprising the steps of:
(a) providing a substrate of a first selected optical material having a chosen index of refraction;
(b) forming a pattern of cavities in one surface of said substrate, said cavities having a predetermined geometry;
(c) depositing a second selected optical material into said cavities in said substrate to a predetermined thickness, said second selected optical material having an index of refraction which is larger than said index of refraction of said first selected optical material;
(d) forming a layer of a third selected optical material on said second selected optical material and on said surface of said substrate to a predetermined thickness, said third optical material having an index of refraction substantially the same as said index of refraction of said substrate; and
(e) heating said substrate with said second selected optical material deposited therein and said layer of said third selected optical material formed thereon to an elevated temperature for a period of time sufficient to diffuse said second selected optical material into said substrate and into said layer of said third selected optical material and to thereby form said plurality of said graded index waveguide structures.

11. A plurality of graded index waveguide structures formed in a selected substrate by the process set forth in claim 10.

* * * * *